US012604235B2

(12) United States Patent
Huang et al.

(10) Patent No.: US 12,604,235 B2
(45) Date of Patent: Apr. 14, 2026

(54) WIRELESS NETWORK LOAD BALANCING

(71) Applicant: QUALCOMM Incorporated, San Diego, CA (US)

(72) Inventors: Xiaolong Huang, Santee, CA (US); Srinivas Katar, Fremont, CA (US); Manish Shukla, Milpitas, CA (US); Sandip Homchaudhuri, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 17/932,622

(22) Filed: Sep. 15, 2022

(65) Prior Publication Data

US 2024/0098560 A1     Mar. 21, 2024

(51) Int. Cl.
*H04W 28/02*          (2009.01)
*H04W 28/08*          (2023.01)

(52) U.S. Cl.
CPC ...  *H04W 28/0284* (2013.01); *H04W 28/0942* (2020.05)

(58) Field of Classification Search
CPC ......... H04W 28/0284; H04W 28/0942; H04W 24/02; H04W 74/0808; H04W 74/0816; H04W 76/15; H04W 84/12; H04W 88/08; H04W 72/52; H04L 47/125
See application file for complete search history.

(56) References Cited

U.S. PATENT DOCUMENTS

| | | | | | |
|---|---|---|---|---|---|
| 10,397,831 | B1 * | 8/2019 | Kim | ..................... | H04W 28/085 |
| 2007/0115906 | A1 * | 5/2007 | Gao | ......................... | G06F 30/33 |
| | | | | | 455/453 |
| 2011/0171952 | A1 * | 7/2011 | Niu | ........................ | H04W 36/22 |
| | | | | | 455/422.1 |
| 2013/0044614 | A1 * | 2/2013 | Aguirre | ................. | H04W 28/24 |
| | | | | | 370/252 |
| 2014/0135015 | A1 * | 5/2014 | Liu | ........................ | H04W 36/22 |
| | | | | | 455/436 |
| 2016/0029248 | A1 * | 1/2016 | Syed | ..................... | H04W 72/52 |
| | | | | | 370/235 |
| 2016/0044538 | A1 * | 2/2016 | Aksu | ..................... | H04W 36/22 |
| | | | | | 370/235 |
| 2016/0050587 | A1 * | 2/2016 | Lam | ...................... | H04W 36/22 |
| | | | | | 370/235 |
| 2016/0277968 | A1 * | 9/2016 | Ekemark | ............. | H04W 28/082 |

(Continued)

OTHER PUBLICATIONS

International Search Report and Written Opinion dated Nov. 15, 2023 from corresponding PCT Application No. PCT/US2023/072656.

(Continued)

*Primary Examiner* — Kan Yuen
(74) *Attorney, Agent, or Firm* — ArentFox Schiff LLP

(57)          ABSTRACT
This disclosure provides methods, devices and systems for load balancing access points (APs) in a mesh network. Certain aspects are directed to obtaining load information from each wireless device of a set of wireless devices, the load information being indicative of resource availability for each band available to each wireless device of the set. In some examples, the disclosure is directed to identifying a first band and a first wireless device of the set of wireless devices associated with the first band based on the first band having a highest level of traffic among bands available to the set of wireless devices.

14 Claims, 16 Drawing Sheets

(56)  References Cited

U.S. PATENT DOCUMENTS

| | | | |
|---|---|---|---|
| 2017/0019907 A1* | 1/2017 | Gokturk | H04W 72/0446 |
| 2019/0174542 A1* | 6/2019 | Lei | H04W 74/0808 |
| 2019/0274066 A1* | 9/2019 | Lai | H04W 36/22 |
| 2019/0373507 A1* | 12/2019 | Chen | H04W 48/20 |
| 2020/0260324 A1* | 8/2020 | Byun | H04W 4/70 |
| 2021/0111815 A1* | 4/2021 | Dion | H04B 17/336 |
| 2021/0219204 A1* | 7/2021 | Shi | H04W 36/22 |

OTHER PUBLICATIONS

Alvaro Lopez-Raventos et al: Multi-link Operation in IEEE 802.
11be WLANs, arxiv . org , Cornell University Library, 201 Olin
Library Cornell University Ithaca, NY 14853, Jan. 19, 2022 (Jan.
19, 2022) , XP091153102.
Alvaro Lopez-Raventos et al: Dynamic Traffic Allocation in IEEE
802.11be Multi-link WLANs, arxiv . org, Cornell University Library,
201 Olin Library Cornell University Ithaca, NY 14853, Feb. 25,
2022 (Feb. 25, 2022), XP091165247.

* cited by examiner

300

Figure 7:
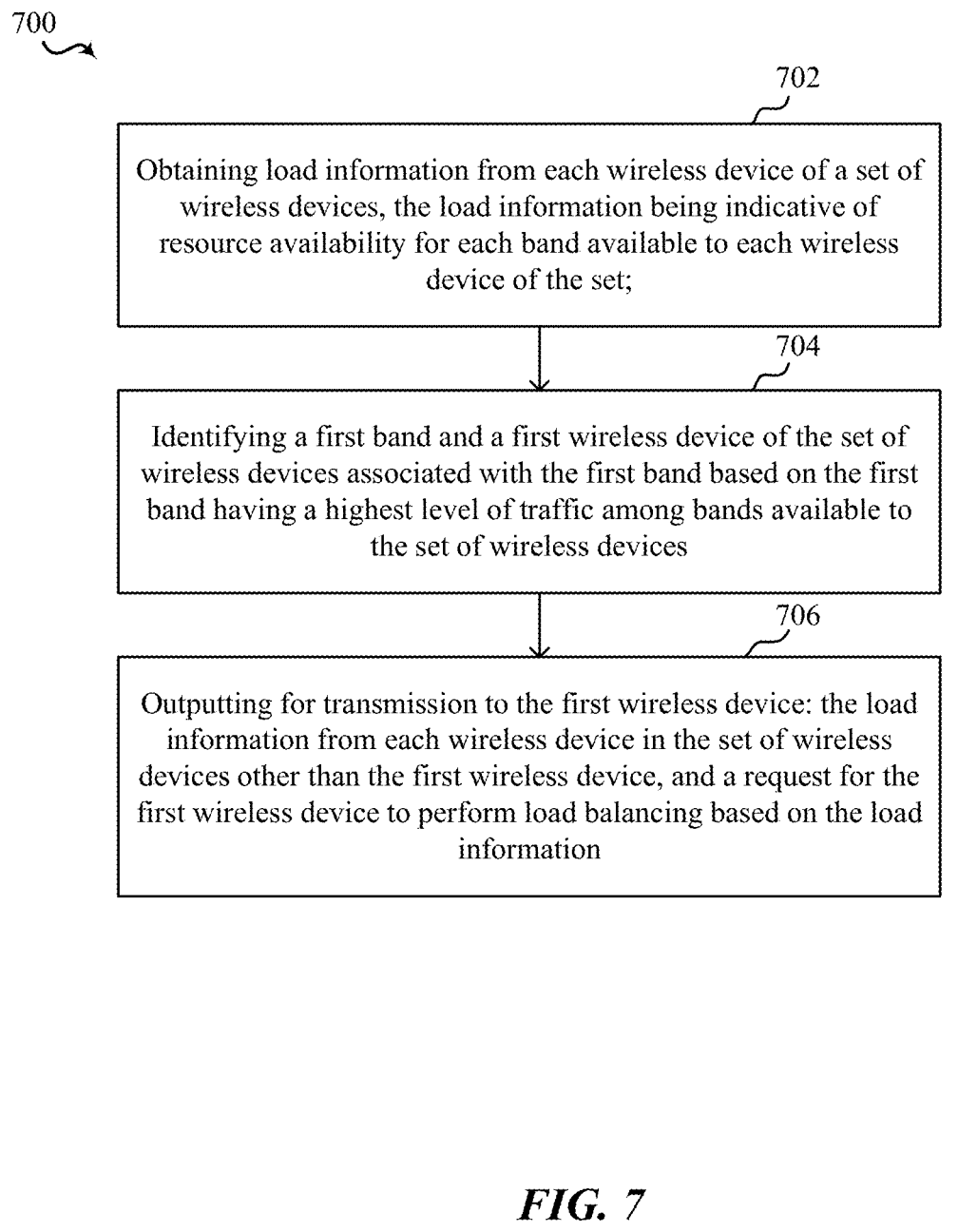

700

702

Obtaining load information from each wireless device of a set of wireless devices, the load information being indicative of resource availability for each band available to each wireless device of the set;

704

Identifying a first band and a first wireless device of the set of wireless devices associated with the first band based on the first band having a highest level of traffic among bands available to the set of wireless devices

706

Outputting for transmission to the first wireless device: the load information from each wireless device in the set of wireless devices other than the first wireless device, and a request for the first wireless device to perform load balancing based on the load information

Figure 8:
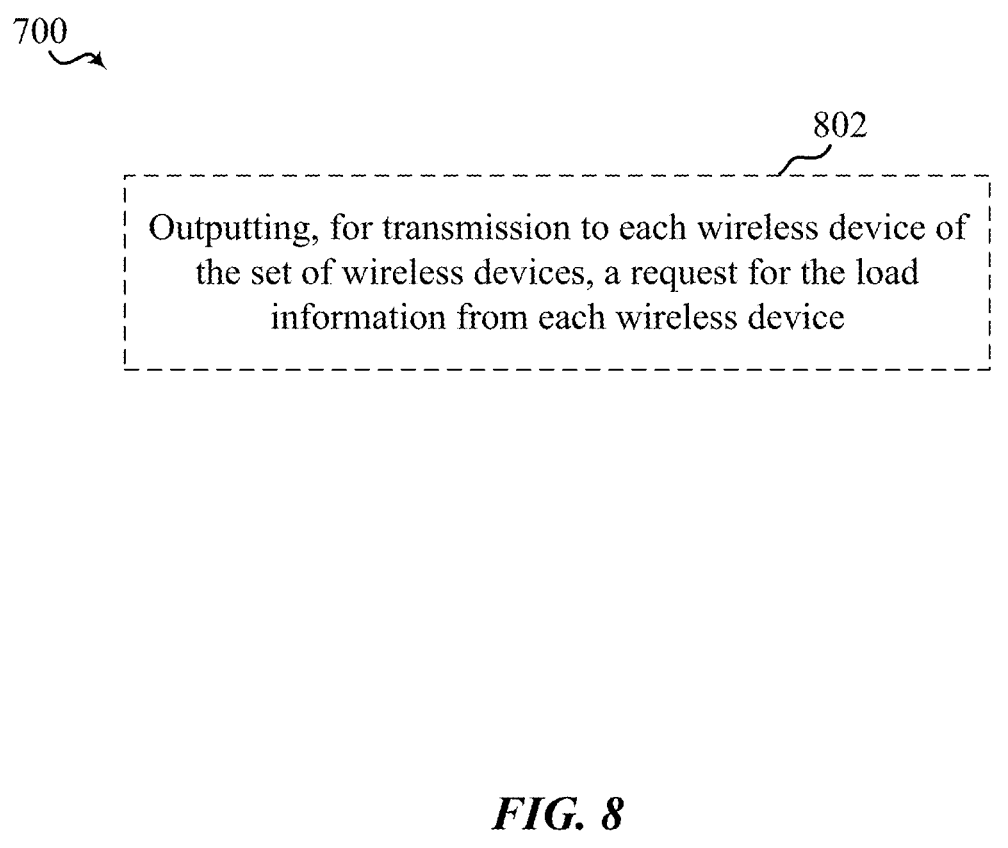

Outputting, for transmission to each wireless device of
the set of wireless devices, a request for the load
information from each wireless device

Figure 9:
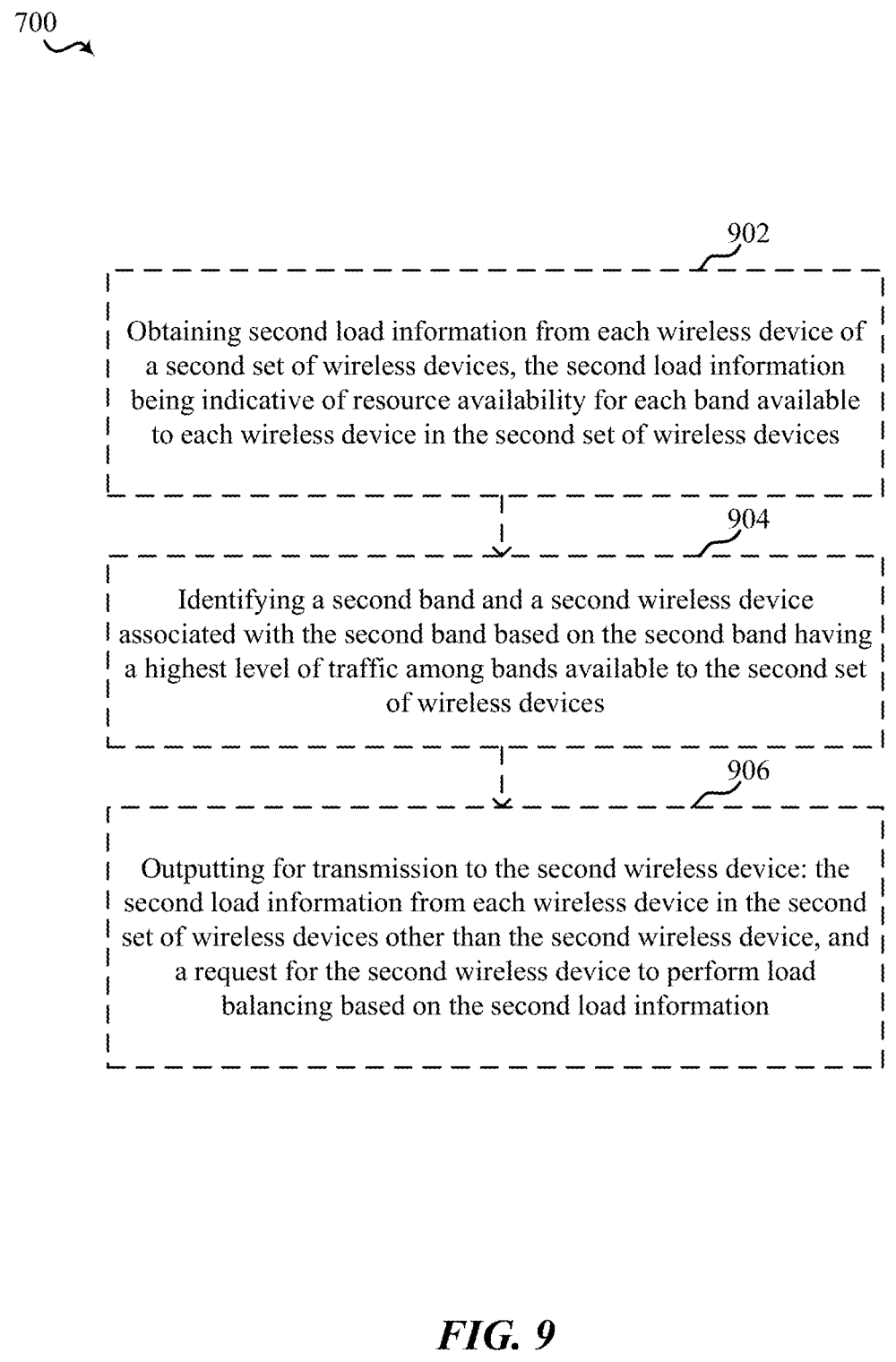

Obtaining second load information from each wireless device of a second set of wireless devices, the second load information being indicative of resource availability for each band available to each wireless device in the second set of wireless devices

904

Identifying a second band and a second wireless device associated with the second band based on the second band having a highest level of traffic among bands available to the second set of wireless devices

906

Outputting for transmission to the second wireless device: the second load information from each wireless device in the second set of wireless devices other than the second wireless device, and a request for the second wireless device to perform load balancing based on the second load information

Figure 11:
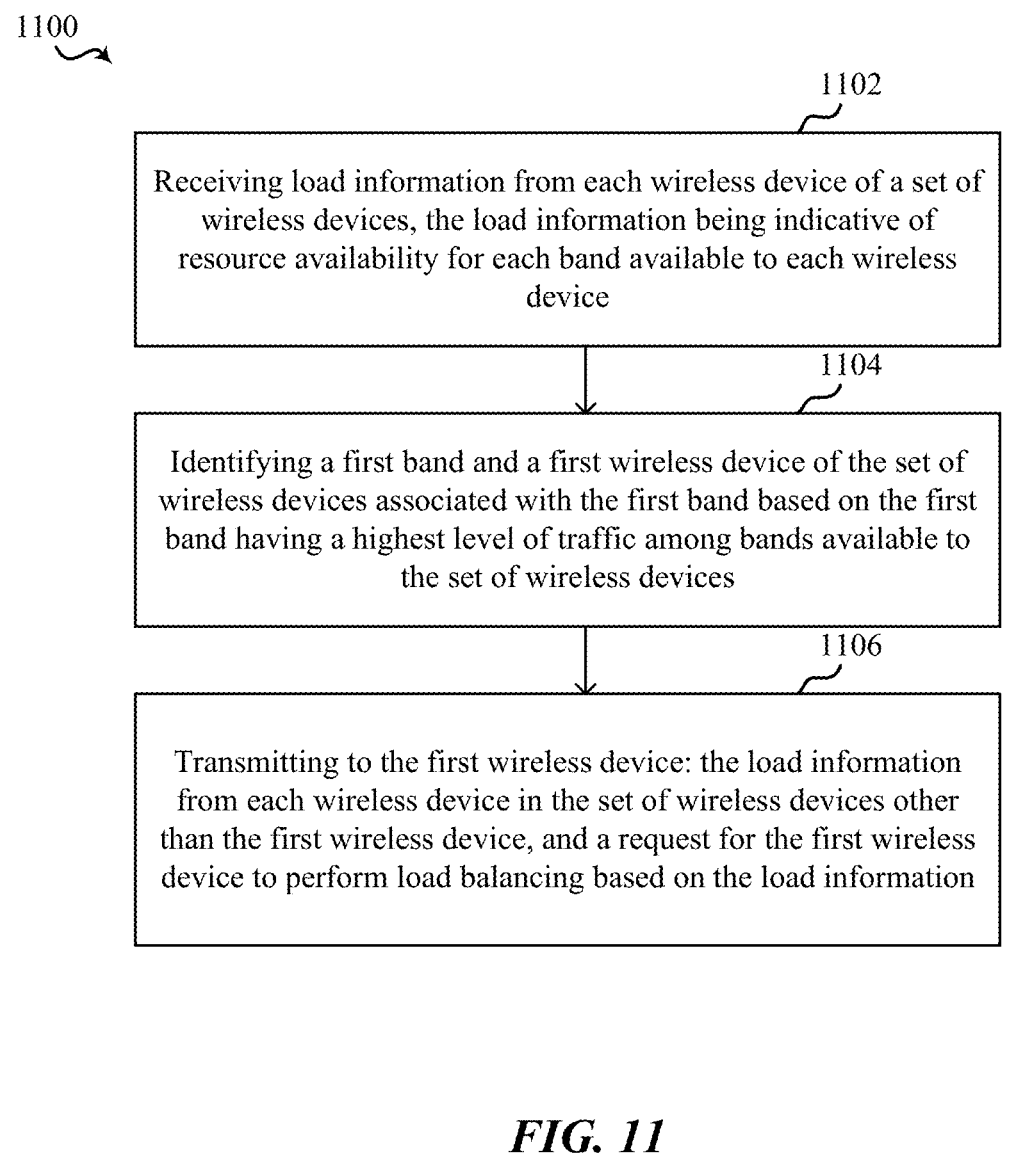

Receiving load information from each wireless device of a set of wireless devices, the load information being indicative of resource availability for each band available to each wireless device

1104

Identifying a first band and a first wireless device of the set of wireless devices associated with the first band based on the first band having a highest level of traffic among bands available to the set of wireless devices

1106

Transmitting to the first wireless device: the load information from each wireless device in the set of wireless devices other than the first wireless device, and a request for the first wireless device to perform load balancing based on the load information

Obtaining load information from a first wireless device of a set of wireless devices, the load information indicative of resource availability for each band available to the first wireless device

1304

Balancing communications associated with the network node based on the load information

1300

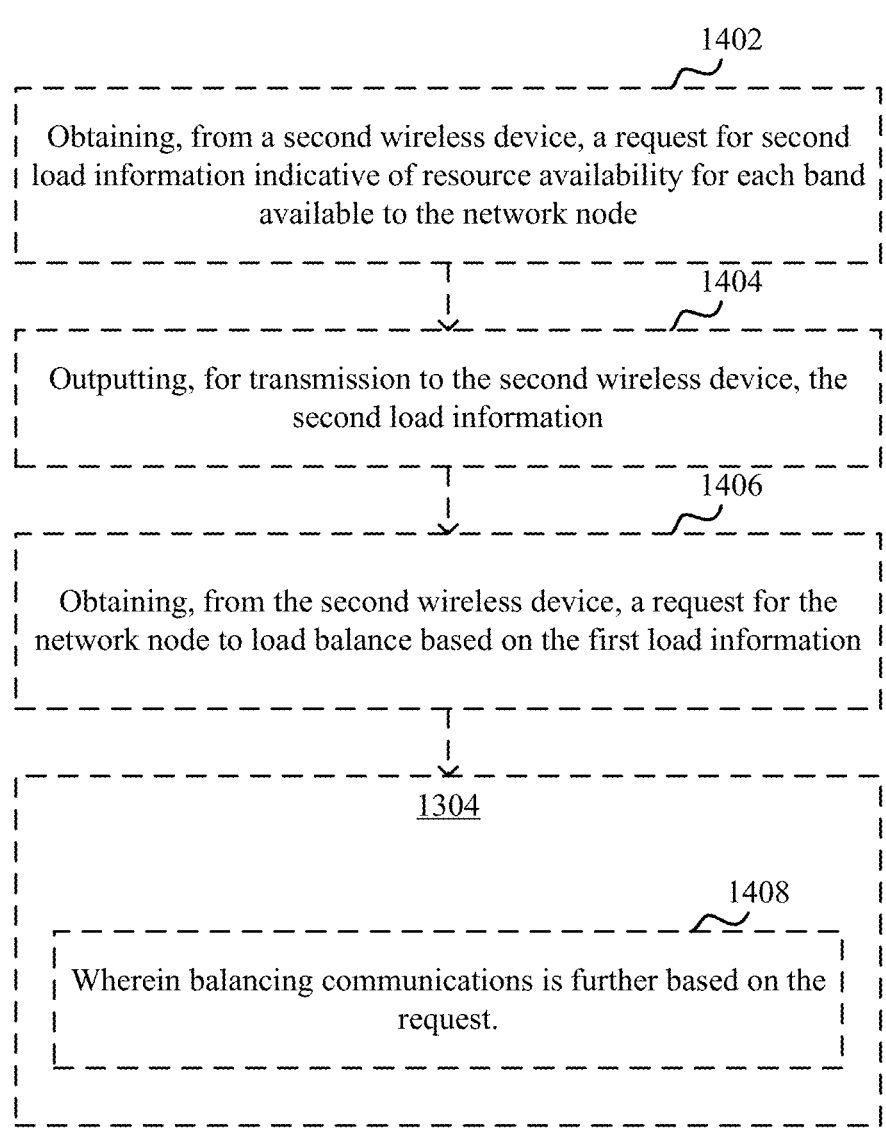

1402

Obtaining, from a second wireless device, a request for second load information indicative of resource availability for each band available to the network node

1404

Outputting, for transmission to the second wireless device, the second load information

1406

Obtaining, from the second wireless device, a request for the network node to load balance based on the first load information

1304

1408

Wherein balancing communications is further based on the request.

Figure 15:
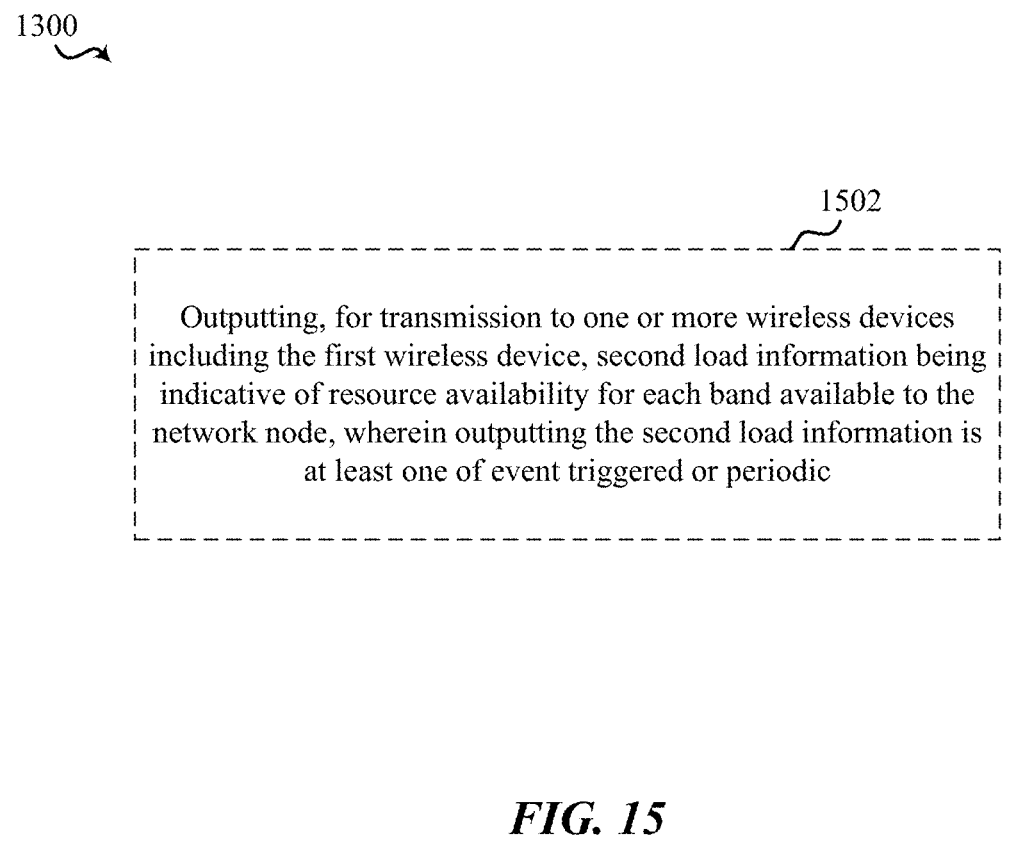

Outputting, for transmission to one or more wireless devices including the first wireless device, second load information being indicative of resource availability for each band available to the network node, wherein outputting the second load information is at least one of event triggered or periodic

Receiving the load information, wherein the network node is configured as a second wireless device

FIG. 16

WIRELESS NETWORK LOAD BALANCING

TECHNICAL FIELD

This disclosure relates generally to wireless communication, and more specifically, addressing techniques for load balancing network nodes in a wireless network.

DESCRIPTION OF THE RELATED TECHNOLOGY

A wireless local area network (WLAN) may be formed by one or more network nodes, such as wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP.

Network nodes can be used to form a wireless mesh network. One characteristic of a mesh network is that there are generally multiple paths through the network that a given user or client may employ to reach the access point. One example of a mesh network is an 802.11 access mesh. If a set of clients in close geographical proximity are equipped with 802.11 cards, they can communicate with other clients in a series of hops until reaching an AP of the mesh network. Typically, the AP is connected to a fixed network using a point-to-point link such as an optical fiber, copper loop, or via another wireless transmission. Due to latency and system complexity the number of wireless router hops is typically kept to some maximum, for example six. This limits the area of coverage of a wireless mesh network to a "cluster" or neighborhood community, the clusters being connected to the fixed network via the access points. Additional access points may be added to reduce the number of hops between clients and APs, and hence to reduce latency and an amount of occupied bandwidth on the mesh.

SUMMARY

The systems, methods and devices of this disclosure each have several innovative aspects, no single one of which is solely responsible for the desirable attributes disclosed herein.

An example aspect includes a method of wireless communication by a network node, comprising obtaining load information from each wireless device of a set of wireless devices, the load information being indicative of resource availability for each band available to each wireless device of the set. The method further includes identifying a first band and a first wireless device of the set of wireless devices associated with the first band based on the first band having a highest level of traffic among bands available to the set of wireless devices. Additionally, the method further includes outputting for transmission to the first wireless device: the load information from each wireless device in the set of wireless devices other than the first wireless device, and a request for the first wireless device to perform load balancing based on the load information.

Another example aspect includes an apparatus for wireless communication by a network node, comprising a memory and a processor coupled with the memory. The processor is configured to obtain load information from each wireless device of a set of wireless devices, the load information being indicative of resource availability for each band available to each wireless device of the set. The processor is further configured to identify a first band and a first wireless device of the set of wireless devices associated with the first band based on the first band having a highest level of traffic among bands available to the set of wireless devices. Additionally, the processor further configured to output for transmission to the first wireless device: the load information from each wireless device in the set of wireless devices other than the first wireless device, and a request for the first wireless device to perform load balancing based on the load information.

Another example aspect includes an apparatus for wireless communication by a network node, comprising means for obtaining load information from each wireless device of a set of wireless devices, the load information being indicative of resource availability for each band available to each wireless device of the set. The apparatus further includes means for identifying a first band and a first wireless device of the set of wireless devices associated with the first band based on the first band having a highest level of traffic among bands available to the set of wireless devices. Additionally, the apparatus further includes means for outputting for transmission to the first wireless device: the load information from each wireless device in the set of wireless devices other than the first wireless device, and a request for the first wireless device to perform load balancing based on the load information.

Another example aspect includes a computer-readable medium comprising stored instructions for wireless communication by a network node, wherein the instructions are executable by a processor to obtain load information from each wireless device of a set of wireless devices, the load information being indicative of resource availability for each band available to each wireless device of the set. The instructions are further executable to identify a first band and a first wireless device of the set of wireless devices associated with the first band based on the first band having a highest level of traffic among bands available to the set of wireless devices. Additionally, the instructions are further executable to output for transmission to the first wireless device: the load information from each wireless device in the set of wireless devices other than the first wireless device, and a request for the first wireless device to perform load balancing based on the load information.

An example aspect includes a method of wireless communication by a network node, comprising receiving load information from each wireless device of a set of wireless devices, the load information being indicative of resource availability for each band available to each wireless device. The method further includes identifying a first band and a first wireless device of the set of wireless devices associated with the first band based on the first band having a highest level of traffic among bands available to the set of wireless devices. Additionally, the method further includes transmitting to the first wireless device: the load information from each wireless device in the set of wireless devices other than the first wireless device, and a request for the first wireless device to perform load balancing based on the load information.

Another example aspect includes an apparatus for wireless communication by a network node, comprising a memory and a processor coupled with the memory. The processor is configured to receive load information from each wireless device of a set of wireless devices, the load information being indicative of resource availability for each band available to each wireless device. The processor is further configured to identify a first band and a first wireless device of the set of wireless devices associated with the first band based on the first band having a highest level of traffic among bands available to the set of wireless devices. Additionally, the processor further configured to transmit to the first wireless device: the load information from each wireless device in the set of wireless devices other than the first wireless device, and a request for the first wireless device to perform load balancing based on the load information.

Another example aspect includes an apparatus for wireless communication by a network node, comprising means for receiving load information from each wireless device of a set of wireless devices, the load information being indicative of resource availability for each band available to each wireless device. The apparatus further includes means for identifying a first band and a first wireless device of the set of wireless devices associated with the first band based on the first band having a highest level of traffic among bands available to the set of wireless devices. Additionally, the apparatus further includes means for transmitting to the first wireless device: the load information from each wireless device in the set of wireless devices other than the first wireless device, and a request for the first wireless device to perform load balancing based on the load information.

Another example aspect includes a computer-readable medium comprising stored instructions for wireless communication by a network node, wherein the instructions are executable by a processor to receive load information from each wireless device of a set of wireless devices, the load information being indicative of resource availability for each band available to each wireless device. The instructions are further executable to identify a first band and a first wireless device of the set of wireless devices associated with the first band based on the first band having a highest level of traffic among bands available to the set of wireless devices. Additionally, the instructions are further executable to transmit to the first wireless device: the load information from each wireless device in the set of wireless devices other than the first wireless device, and a request for the first wireless device to perform load balancing based on the load information.

An example aspect includes a method of wireless communication by a network node, comprising obtaining load information from a first wireless device of a set of wireless devices, the load information indicative of resource availability for each band available to the first wireless device. The method further includes balancing communications associated with the network node based on the load information.

Another example aspect includes an apparatus for wireless communication by a network node, comprising a memory and a processor coupled with the memory. The processor is configured to obtain load information from a first wireless device of a set of wireless devices, the load information indicative of resource availability for each band available to the first wireless device. The processor is further configured to balance communications associated with the network node based on the load information.

Another example aspect includes an apparatus for wireless communication by a network node, comprising means for obtaining load information from a first wireless device of a set of wireless devices, the load information indicative of resource availability for each band available to the first wireless device. The apparatus further includes means for balancing communications associated with the network node based on the load information.

Another example aspect includes a computer-readable medium comprising stored instructions for wireless communication by a network node, wherein the instructions are executable by a processor to obtain load information from a first wireless device of a set of wireless devices, the load information indicative of resource availability for each band available to the first wireless device. The instructions are further executable to balance communications associated with the network node based on the load information.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 7 is a flowchart of an example of a method of wireless communication by a network node.

FIG. 8 is a flowchart of additional aspects of the method of FIG. 7.

FIG. 9 is a flowchart of additional aspects of the method of FIG. 7.

FIG. 11 is a flowchart of an example of a method of wireless communication by a network node.

FIG. 14 is a flowchart of additional aspects of the method of FIG. 13.

FIG. 15 is a flowchart of additional aspects of the method of FIG. 13.

FIG. 16 is a flowchart of additional aspects of the method of FIG. 13.

DETAILED DESCRIPTION

Figure 1:
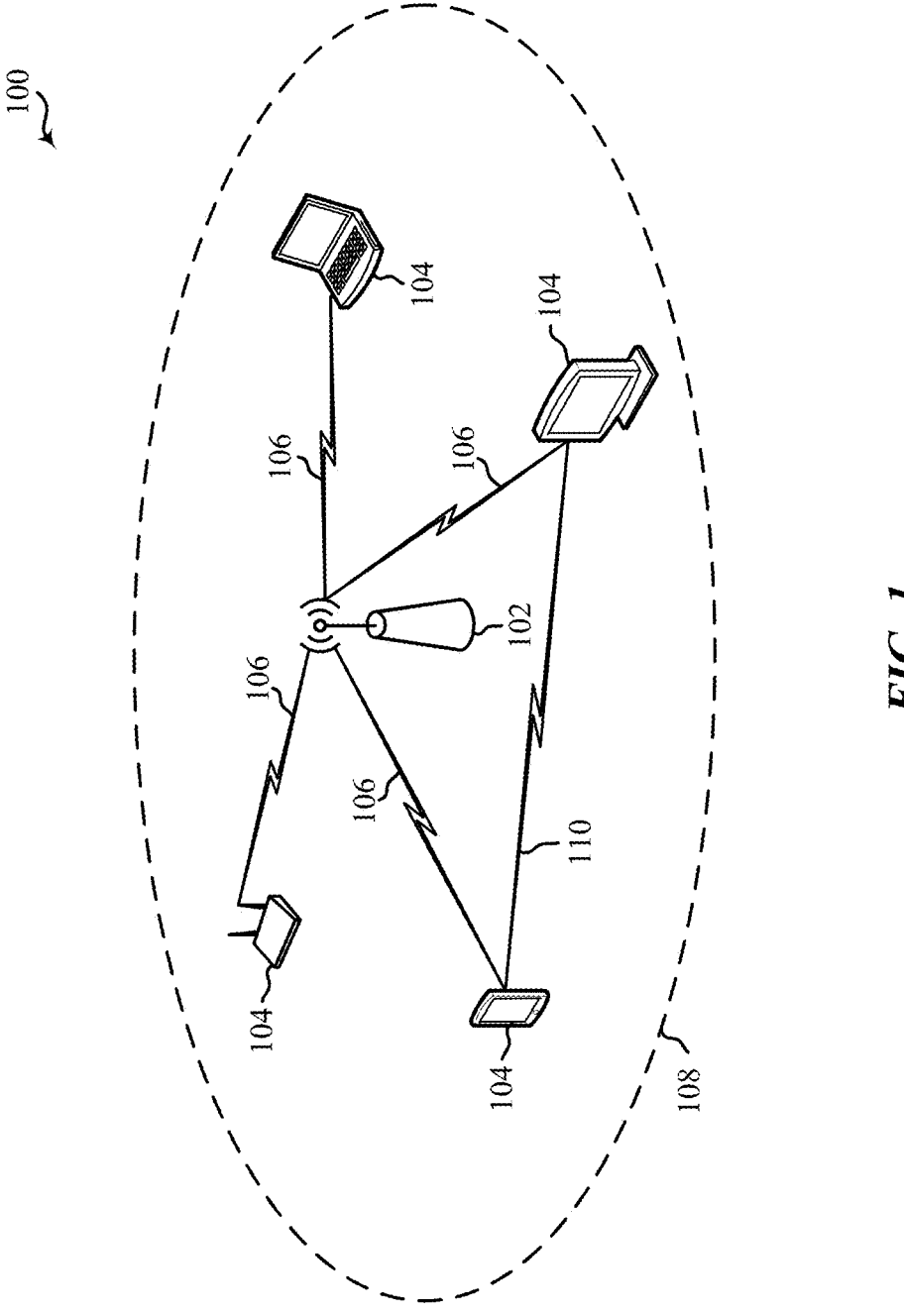
FIG. 1 is a pictorial diagram illustrating an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the $3^{rd}$ Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Aspects of the disclosure are directed to joint access point (AP) multi-link device (MLD) configured for multi-link operations (MLOs). Specifically, load balancing among AP MLDs in a mesh network in a coordinated Wi-Fi AP operation.

Certain aspects are directed to a centralized load balancing technique. Here, all AP MLDs report their available airtime information (e.g., load information) for all their MLO links to a centralized controller for the mesh network. The controller may calculate a load balancing based on the load information and transmit a request to one or more APs to perform the load balance based on the calculation.

Certain aspects are directed to a semi-distributed load balancing technique. Here, all AP MLDs report their load information for all their MLO links to the controller, and the controller identifies all AP MLDs that have an N-hop most congested tuple (e.g., N by default is set to 2). The controller may then send the available airtime stats of all MLO links of 1-hop overlapping AP MLDs of those N-hop most congested tuples to those most congested AP MLDs.

Certain aspects are directed to a fully distributed load balancing technique. Here, each AP MLD of a mesh network may transmit its load information of all its MLO links to all AP MLDs within N-hops (e.g., N by default is set to 2). An AP MLD that has the N-hop most congested tuple may perform the load balance routine.

FIG. 1 is a network schematic illustrating an example wireless communication network 100. According to some aspects, the wireless communication network 100 can be an example of a wireless local area network (WLAN) such as a Wi-Fi network (and will hereinafter be referred to as wireless communication network 100). For example, the wireless communication network 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba, and 802.11be). The wireless communication network 100 may include numerous wireless communication devices such as an access point (AP) 102 and multiple stations (STAs) 104. While only one AP 102 is shown, the wireless communication network 100 also can include multiple APs 102 (e.g., multiple APs that are part of an AP multi-link device (MLD)).

Certain aspects of the disclosure may relate to multi-link (ML) communications between wireless MLDs. Each MLD may have a unique medium access control (MAC) address, which is also referred to as a MAC service access point (MAC-SAP) endpoint. One example of an MLD device is an AP MLD 102, which includes multiple APs each capable of communicating on multiple communication links and establishing a basic service set (BSS) on the multiple communication links. Another example of an MLD device is a STA MLD 104 (e.g., a non-AP MLD), which includes multiple STAs capable of communicating with other devices (such as an AP MLD 102) on multiple communication links. The STA MLD 104 may have one medium access control physical layer (MAC-PHY) instance for each of the multiple communication links, and the MAC address of each MAC-PHY instance may be the same or different.

Each of the STAs 104 also may be referred to as a mobile station (MS), a mobile device, a mobile handset, a wireless handset, an access terminal (AT), a user equipment (UE), a subscriber station (SS), a non-AP MLD, or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified to users by a service set identifier (SSID), as well as to other devices by a basic service set identifier (BSSID), which may be a medium access control (MAC) address of the AP 102. The AP 102 periodically broadcasts beacon frames including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the wireless communication network 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the wireless communication network 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

Each of the frequency bands may include multiple subchannels or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
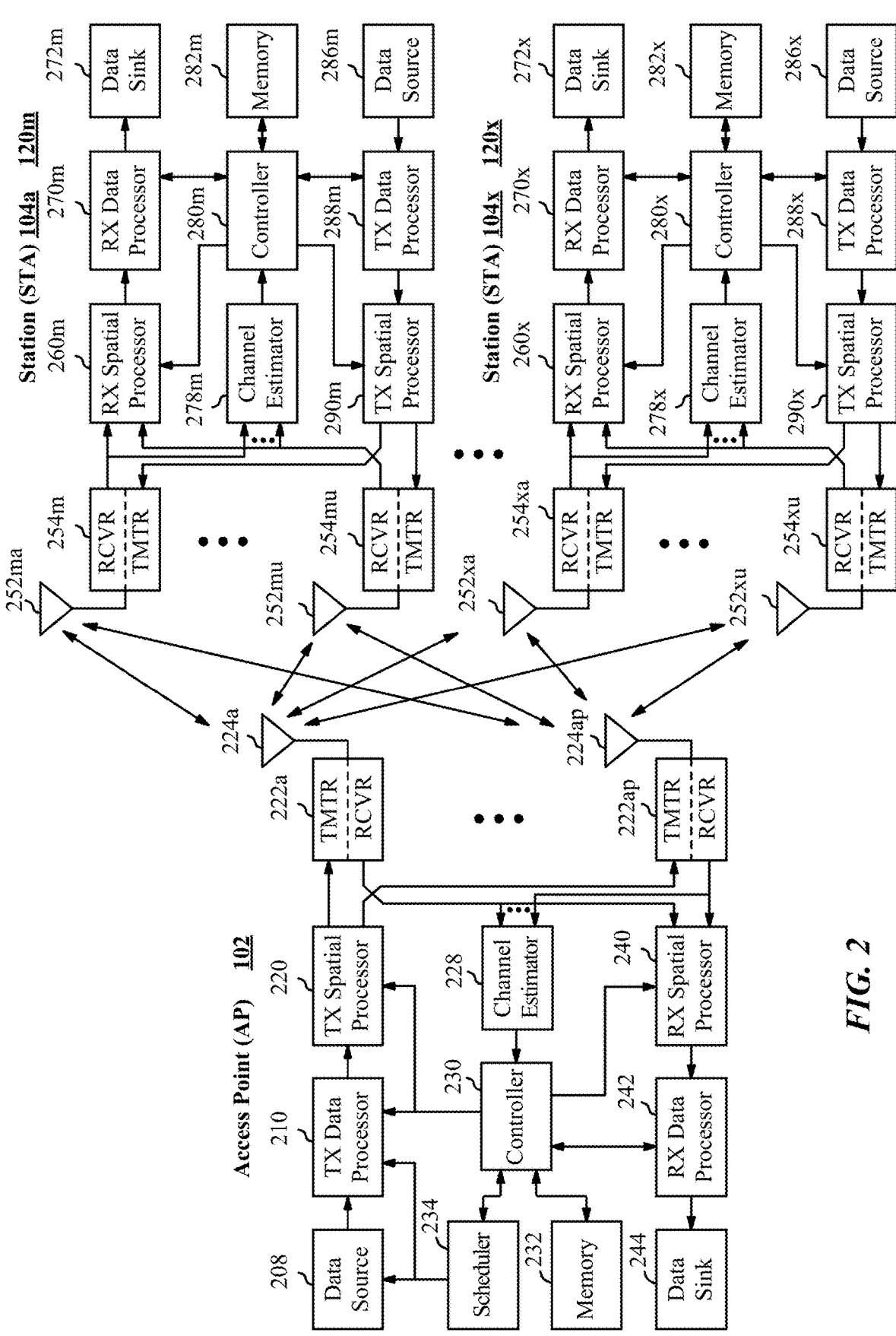
FIG. 2 is a diagram illustrating hardware aspects of an access point (AP) and two stations.

FIG. 2 illustrates a block diagram of an AP 102 and two STAs 104a and 104x in a BSS. The AP 102 is equipped with $N_t$ antennas 224a through 224t. STA 120m is equipped with $N_{ut,m}$ antennas 252ma through 252mu, and STA 120x is equipped with $N_{ut,x}$ antennas 252xa through 252xu. The AP 102 is a transmitting entity for the downlink and a receiving entity for the uplink. Each STA 104 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each STA 104 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the AP 102.

$N_{up}$ STAs may be scheduled for simultaneous transmission on the uplink. Each of these STAs performs spatial processing on its data symbol stream and transmits its set of transmit symbol streams on the uplink to the AP 102.

At the AP 102, $N_{ap}$ antennas 224a through 224ap receive the uplink signals from all $N_{up}$ STAs transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at AP 102, a TX data processor 210 receives traffic data from a data source 208 for $N_{dn}$ STA scheduled for downlink transmission, control data from a controller 230, and possibly other data from a scheduler 234. The various types of data may be sent on different transport channels. TX data processor 210 processes (e.g., encodes, interleaves, and modulates) the traffic data for each STA based on the rate selected for that STA. TX data processor 210 provides $N_{dn}$ downlink data symbol streams for the $N_{dn}$ STA. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the STA.

At each STA 120, $N_{ut,m}$ antennas 252 receive the $N_{ap}$ downlink signals from AP 102. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the STA. The receiver spatial processing is performed in accordance with the CCMI, MMSE or some other technique. An RX data processor 270 processes (e.g., demodulates, deinterleaves and decodes) the recovered downlink data symbol stream to obtain decoded data for the STA.

At each STA 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each STA typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each STA may send feedback information (e.g., the downlink and/or uplink eigenvectors, eigenvalues, SNR estimates, and so on) to the access point. Controllers 230 and 280 also control the operation of various processing units at AP 102 and STA 104, respectively.

The devices (e.g., APs 102 and STAs 104) may create an ad-hoc network (e.g., mesh network) using wireless signaling to exchange information regarding the WAN/WLAN mobile environment. A mesh network may include a number of APs 102 joined together to connect one or more clients or STAs 104 to a WAN, such as the Internet. One or more APs 102 may include a wired backhaul connection the WAN.

A mesh network may be created by establishing radio links between the number of APs 102. The radio links may be implemented with any suitable wireless protocol including, by way of example, IEEE 802.11 (Wi-Fi), IEEE 802.20 (Wi-Max), Bluetooth, Ultra Wideband (UWB), or any other wireless protocol having any suitable underlying air interface. Examples of air interfaces include Orthogonal Frequency-Division Multiple Access (OFDMA), Wideband Code Division Multiple Access (W-CDMA), and the like. Moreover, various concepts disclosed throughout this disclosure may be extended wide area networks employing various wireless protocols including, by way of example, CDMA2000, Global System for Mobile Communications (GSM), Ultra Mobile Broadband (UMB), Enhanced Data rates for GSM Evolution (EDGE), etc. The specific wireless protocol used for any mesh network will vary depending on the specific application and the overall design constraints imposed on the overall system.

Load balancing among MLO links in a mesh network is of primary importance for improving aggregate throughput and quality of service (QoS) for communications. In a standalone AP MLO operation, an AP MLD can make effective load balance decisions on its own by monitoring a traffic load between its MLO links, and move traffic from one MLO link to another as needed.

However, in a Wi-Fi mesh network, a load balance act of one AP MLD can cause further load imbalance on a different AP MLD. This problem can be exacerbated if both APs share the same channel because neither AP may consider the traffic load of the other AP due to their different OBSS activity at different locations. Accordingly, coordination of load balancing acts performed by an AP MLD in a mesh network among other AP MLDs may prevent load imbalances within the mesh network and prevent non-convergent back-and-forth load balance acts.

Aspects of the disclosure are directed to several solutions for coordinating load balancing among different AP MLDs. In some examples, the solutions allow AP MLDs to maintain and run their own load balancing routines, prevent causing further load imbalance on among other AP MLDs in the same mesh network, and prevent non-convergent back-and-forth load balance acts.

Example Centralized-Architecture Load Balancing Solution

Figure 3:
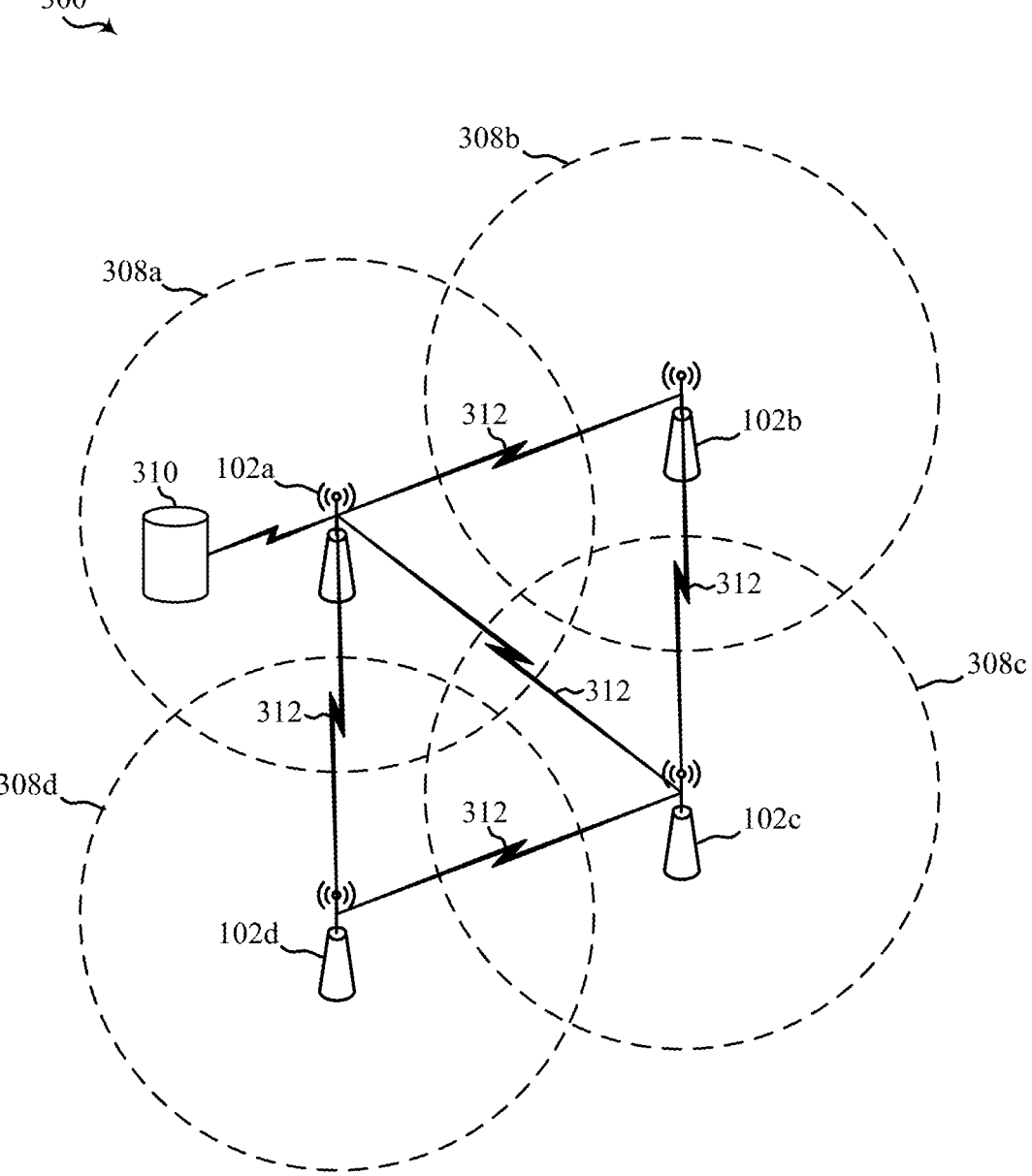
FIG. 3 is a schematic diagram conceptually illustrating a mesh network including multiple AP MLDs.

FIG. 3 is a schematic diagram conceptually illustrating a mesh network 300 including multiple AP MLDs (e.g., AP 102 of FIGS. 1 and 2) including a first AP 102a, a second AP 102b, a third AP 102c, and a fourth AP 102d. FIG. 3 additionally shows an example coverage area 308 for each AP 102, which may represent a BSA of each AP 102. As illustrated, the first AP 102a is in communication (e.g., backhaul, dedicated line, and/or wireless communication) with a central controller (e.g., a server) configured for centralized load balancing of the mesh network 300. Although the central controller 310 is illustrated as being remote relative to the first AP 102a, other embodiments may include a central controller that is integrated into the first AP 102a (e.g., implemented as software and/or hardware of the first AP 102*a*). Each AP 102 may be capable of communicating directly with each other via direct wireless links 312 (e.g., MLO links).

In some examples, the central controller 310 may collect load information per AP MLD 102 per wireless link from all APs 102. The central controller may identify the global most congested tuple (e.g., AP MLD and associated band). That is, the tuple may identify a particular AP 102 and a band, wherein that band is the most congested with communications associated with the particular AP 102 relative to other bands and APs 102 in the mesh network 300. Each AP 102 in the mesh network may use share one or more bands for their communications. For example, each AP 102 may use the same three bands (e.g., B1, B2, and B3) for communications in each BSA as other APs 102 in the mesh network 300.

In some examples, each of the APs 102 may report their load information to the controller 310 (e.g., via wireless communication with the controller, via routing through the first AP 102*a*, etc.). Thus, each AP 102 may have a direct or indirect connection with the controller 310. The load information may indicate the airtime available to each AP 102 (e.g., available time and/or frequency resources for wireless communications) for each band used by each of the APs 102.

Figure 4:
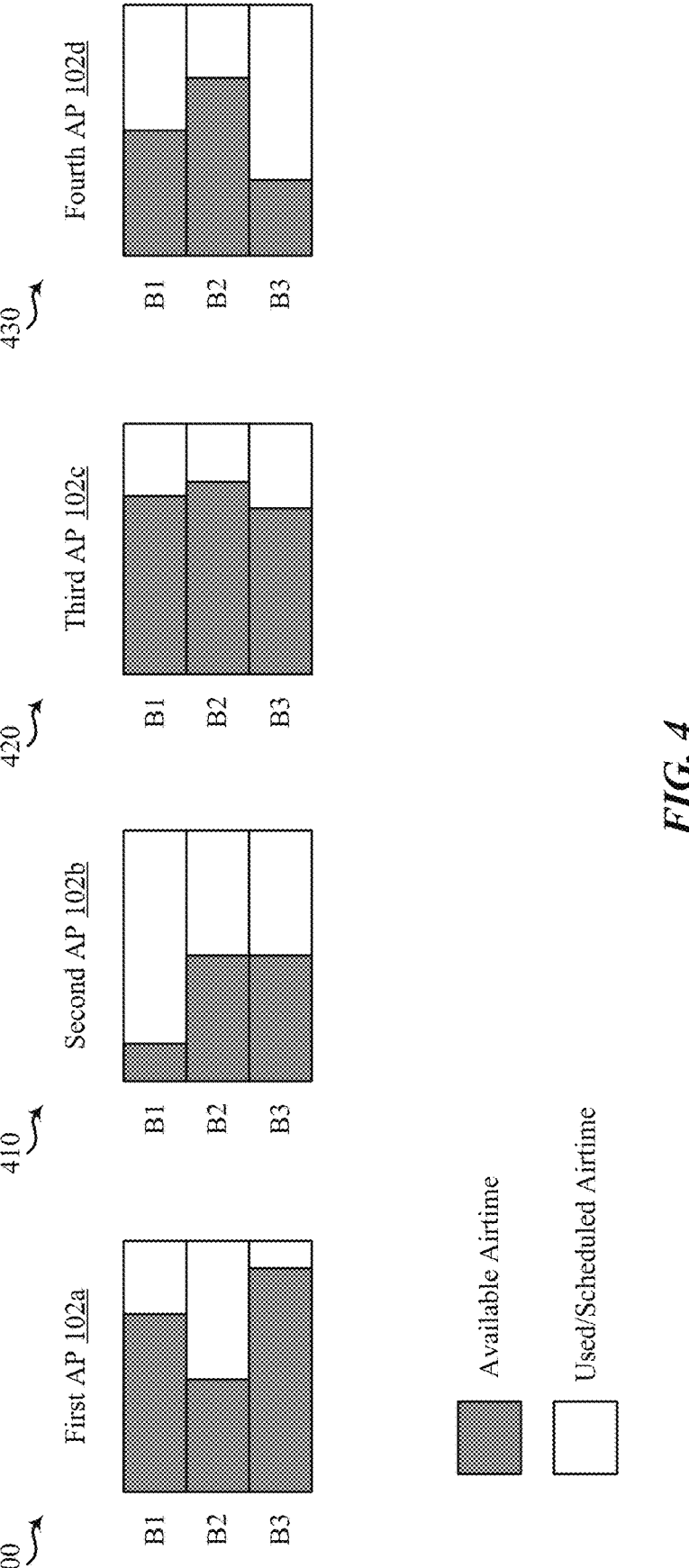
FIG. 4 is a block diagram conceptually illustrating available airtime for each band used by each AP of FIG. 3.

FIG. 4 is a block diagram conceptually illustrating available airtime (e.g., load information) for each band used by each AP 102 of FIG. 3 from the perspective of each AP 102. For example, a first graph 400 illustrates available airtime for the first AP 102*a*, a second graph 410 illustrates available airtime for the second AP 102*b*, a third graph 420 illustrates available airtime for the third AP 102*c*, and a fourth graph 430 illustrates available airtime for the fourth AP 102*d*. Here, the shaded region of each band indicates resources available for communication by a corresponding AP over a corresponding band (e.g., B1, B2, B3), whereas the unshaded region indicates an amount of the band used by the corresponding AP. Thus, each band has a finite amount of resources available for a given period of time using the particular frequency resources associated with each band.

In the examples illustrated in FIGS. 3 and 4, each AP 102 may provide their respective load information to the controller 310. In some examples, the APs 102 may transmit their respective load information periodically (e.g., wherein each AP 102 transmits its respective load information at the same time) and/or sporadically (e.g., event triggered), wherein either case may be (pre-)configured by the controller 310. In another example, the controller 310 may transmit, to each AP MLD 102 of the mesh network 300, a request for the load information from each AP MLD 102.

Accordingly, the controller 310 may receive load information from each AP MLD 102 the mesh network 300, wherein the load information is indicative of resource availability for each band available to each of the APs. For example, the load information may be indicative of a percentage of airtime available for serving traffic over a particular band used by a corresponding AP 102 for communication (e.g., the first AP 102*a* has 75% of the resources over B1 available, 40% over B2, 90% over B3).

The controller may then identify a particular MLO band and a corresponding AP associated with the particular band based on the band having a highest level of traffic (e.g., used/scheduled airtime) among bands available to the APs in the mesh network 300. That is, the controller 310 may determine a highest traffic tuple globally throughout the mesh network 300. As illustrated, the controller 310 may identify the second AP 102*b* as the BSS of the most congested band (e.g., B1). For example, a tuple identifying the AP and the band may be generated as (AP2, B1).

In some cases, the controller 310 may then determine a subset of APs within the mesh network for load balancing purposes. In a first example, the controller may determine the subset of APs of the mesh network have overlapping BSSs (OBSSs) with the AP identified in the tuple (e.g., second AP 102*b*). As illustrated in FIG. 3, the APs with OBSSs include the first AP 102*a* and the third AP 102*c*, but not the fourth AP 102*d*. In a second example, the controller 310 may determine the subset of APs based on a number of hops (e.g., N) from the AP identified in the tuple (e.g., the second AP 102*b*). Here, a "hop" may refer to a number of direct communication links required to reach an AP from the AP identified in the tuple. In this example, if N=1, then the subset of APs may include the first AP 102*a* and the third AP 102*c* because there is only one direct communication link between the second AP 102*b* and each of the first AP 102*a* and the third AP 102*c*. If N=2, the subset of APs may include the first AP 102*a*, the third AP 102*c*, and the fourth AP 102*d*.

The controller 310 may then determine which band has the least amount of traffic from the perspective of the AP identified in the tuple, then determine which of the subset of APs has the most available resources for that band. In this example, the second AP 102*b* has the same amount of resources available for communication in both of B2 and B3. Accordingly, the controller 310 may determine which of B2 or B3 has the most resources (e.g., least congested with traffic) from the perspective of the first AP 102*a* and the third AP 102*c*. In the example illustrated in FIG. 4, the controller 310 may determine that B3 has the most available airtime (e.g., from the perspective of the first AP 102*a*).

Thus, based on the determination, the controller 310 may transmit, to the second AP 102*b*, one or more of the following: the load information from each wireless device in the subset of wireless devices (other than the load information of the second AP 102*b*), and a request for the second AP 102*b* to perform load balancing based on the load information of the subset of wireless devices. The second AP 102*b* may receive the request and the load information and perform load balancing based on the information.

In some examples, the request may include an indication of the band with the most airtime within the subset of APs (e.g., B3). In this example, the second AP 102*b* may receive the request and perform load balancing by moving communications from B1 to B3. The process may be repeated.

This prevents the second AP 102*b* from moving traffic to both B2 and B3, thereby preventing interference between the first AP 102*a*, the second AP 102*b*, and the third AP 102*c* because the load balance takes into account the available band resources for each of these APs.

Example Semi-Distributed Load Balancing Solution

In the examples illustrated in FIGS. 3 and 4, each AP 102 may provide their respective load information to the controller 310. In some examples, the APs 102 may transmit their respective load information periodically (e.g., wherein each AP 102 transmits its respective load information at the same time) and/or sporadically (e.g., event triggered), wherein either case may be (pre-)configured by the controller 310. In another example, the controller 310 may transmit, to each AP MLD 102 of the mesh network 300, a request for the load information from each AP MLD 102.

The controller 310 may collect the load information for each MLO link (e.g., links 312) used by each AP MLD 102. The controller 310 may then identify all N-hop most congested tuples (AP MLD, band). That is, the controller 310 may consider each AP 310 of the mesh network 300 individually, then group certain of the APs 102 based on each AP MLD in the group being less than or equal to N direct hops or links away from the particular AP MLD. For example, for each AP 102 in the mesh network 300, the controller 310 may group that AP 102 with all other APs that are less than or equal to N direct hops away (e.g., N=1 hop is one MLO link between two APs, N=2 is two MLO links between two APs). Accordingly, certain APs (e.g., first AP 102*a* and third AP 102*c*) may be part of 2 different groups (e.g., a group formed around the second AP 102*b* and another group formed around the fourth AP 102*d*).

The controller 310 may then determine, for each group, which tuple (e.g., band and AP) has the highest amount of traffic for that AP. Thus, referring to FIG. 4, where N=2, the resulting tuple is the same as the example described above for the centralized-architecture load balancing solution. However, when N=1, the controller 310 may determine the locally most congested tuples as B1 of the second AP 102*b* and B3 of the fourth AP 102*d*. The controller 310 may then provide, to the AP having the highest traffic congestion and associated with the tuple determined for each group, the load information of each AP in the corresponding group (e.g., less than all APs in the mesh network). In the N=1 example, the controller 310 may provide: (i) the second AP 102*b* with load information from the first AP 102*a* and the third AP 102*c*, and (ii) the fourth AP 102*d* with load information from the first AP 102*a* and the third AP 102*c*.

The controller 310 may then request that all APs with the highest traffic congestion (e.g., the APs identified in the tuple determined for each group) in each group perform load balancing using the load information of other APs in the corresponding group. For the load balancing, the second AP 102*b* may identify the band having the largest available airtime among the first AP 102*a*, the second AP 102*b*, and the third AP 102*c* (e.g., a first group). Here, the first AP 102*a* load information indicates that B3 has the most available airtime. Thus, the second AP 102*b* may move a portion of its traffic from B1 to B3. Similarly, the fourth AP 102*d* may identify B2 as having the largest available airtime among the fourth AP 102*d*, the second AP 102*b*, and the third AP 102*c* (e.g., a second group). Thus, the fourth AP 102*d* may move a portion of its traffic from B3 to B2. It should be noted that in the forgoing examples for each group, the AP may move traffic from its most congested band to a band having the least congestion of the group.

As noted, the process of the semi-distributed load balancing solution may be performed periodically and/or be event driven. For example, if a threshold condition is satisfied (e.g., a band gets to a pre-configured level of congestion for an AP), the AP may request that the controller 310 initiate load balancing among the groups of APs in the mesh network 300.

Example Semi-Distributed Load Balancing Solution

Figure 5:
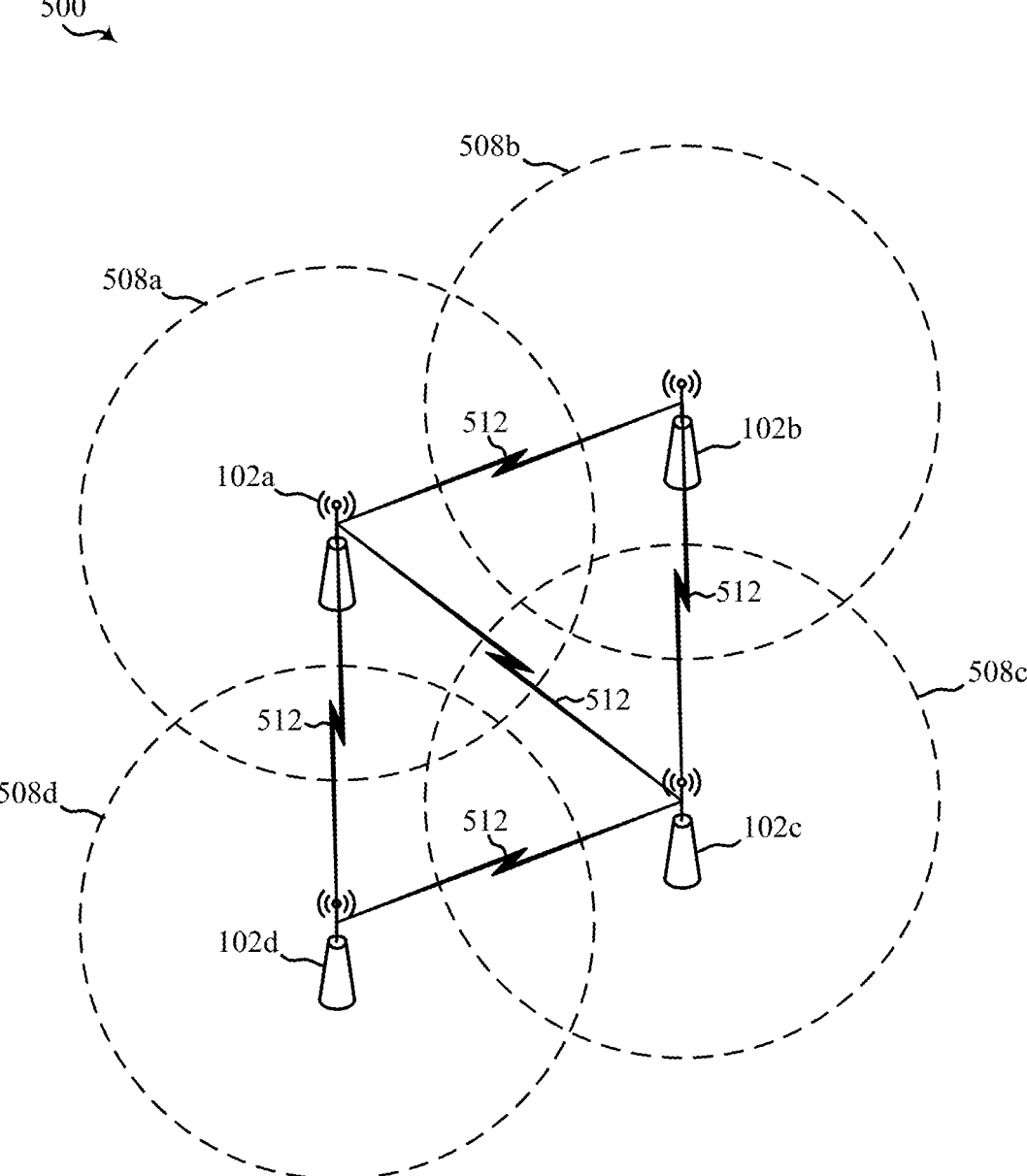
FIG. 5 is a schematic diagram conceptually illustrating a mesh network including multiple AP MLDs.

FIG. 5 is a schematic diagram conceptually illustrating a mesh network 500 including multiple AP MLDs (e.g., AP 102 of FIGS. 1 and 2) including the first AP 102*a*, the second AP 102*b*, the third AP 102*c*, and the fourth AP 102*d*. FIG. 5 is similar to FIG. 3, however, it should be noted that the example of FIG. 5 omits a central controller (e.g., controller 310 of FIG. 3). Each AP 102 may be capable of communicating directly with each other via direct wireless links 512

(e.g., MLO links). The directed wireless links 512 may operate in a manner similar to the direct wireless links 312 of FIG. 3.

In the example illustrated in FIG. 5, each AP 102 may be configured to transmit its load information to all neighbor APs (e.g., APs within N hops of the transmitting AP) in the mesh network 500. Each neighbor AP may further propagate load information received from other APs to its neighbors. One AP 102 may determine, based on the received load information of other APs, that one of the bands it uses has the highest traffic congestion relative to the other APs. The AP 102 with the highest traffic congestion may perform load balancing while the rest of the APs refrain from performing load balancing.

As with the examples described above, the process may repeat periodically (e.g., once every one or more minutes) and/or may be triggered by an event driven process (e.g., if resources available on a band fall below a threshold value for a particular AP). An AP 102 may be triggered to send out its own load information if it receives load info from another AP. An AP 102 may further be triggered to compare its own load information to the received load information to determine whether it has a higher level of traffic congestion on one or more of its bands relative to the other AP.

In some examples, an AP may wait for a duration of time prior to determining whether it has the highest traffic congestion. This duration may be configured to provide enough time for load information to travel to the AP from other APs in the mesh network 300 that may be multiple (N>1) hops away.

In an example where N=1 and using FIGS. 4 and 5 as an example, band B1 used by the second AP 102*b* meets a threshold level of congestion. Accordingly, the second AP 102*b* may transmit its load information to the first AP 102*a* and the third AP 102*c*. In response to receiving the load information from the second AP 102*b*, both the first AP 102*a* and the third AP 102*c* may transmit their load information to the second AP 102*b*. However, in some examples, the first AP 102*a* and the third AP 102*c* may not transmit their load information to the second AP 102*b* if their load information has not changed since the last time it was provided to the second AP 102*b*. In such an example, the second AP 102*b* may assume the load information is the same if a response is not received from the first AP 102*a* and/or the third AP 102*c* within a window of time.

Because N=1, the first AP 102*a* and the third AP 102*c* may not transmit the load information for the second AP 102*b* to the fourth AP 102*d*. However, if N>1, then the first AP 102*a* and the third AP 102*c* may transmit their load information and the load information of the second AP 102*b* to the fourth AP 102*d*. The second AP 102*b* may wait for a duration of time (e.g., a preconfigured time window) before it determines whether it has the most congested band or performs load balancing. The duration of time may provide the second AP 102*b* with enough time to collect load information from all the APs within N hops of the second AP 102*b*.

Where N=2, the second AP 102*a* may transmit load information to the first AP 102*a* and the third AP 102*c*. The first AP 102*a* and the third AP 102*c* may then transmit their own load information (e.g., if it has changed since the last time they sent it) and the load information from the second AP 102*b* the fourth AP 102*d*. The first AP 102*a*, the third AP 102*c*, and the fourth AP 102*d* (e.g., via the first AP 102*a* and/or the third AP 102*c*) may send their respective load information to the second AP 102*b* if their load information has changed since the last time the information was sent. The second AP 102*b* may perform load balance if it has the most congested band after waiting a window of time to receive load information from other APs. During the window of time, the other APs may inform the second AP 102*b* that it is not the most congested, which would prevent the second AP 102*b* from performing load balancing.

Figure 6:
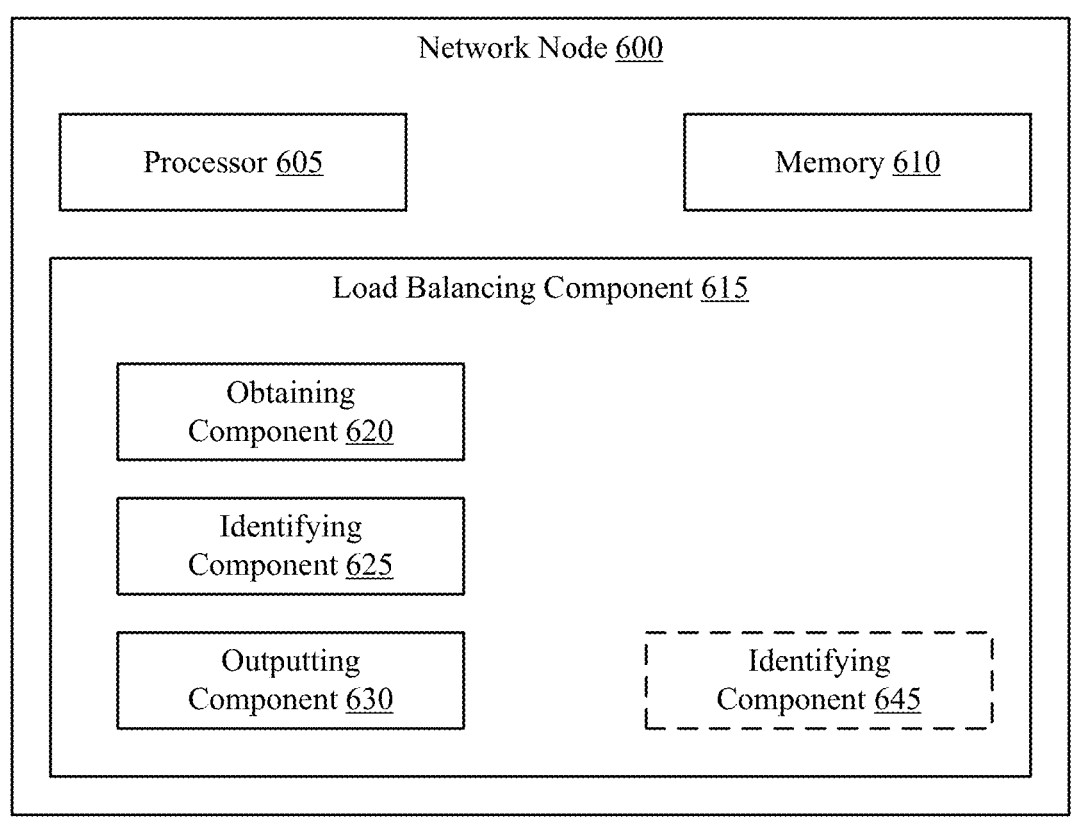
FIG. 6 is a block diagram of an example of an apparatus having components configured to perform a method of wireless communication by a network node.

Referring to FIGS. 6 and 7, in an aspect, a network node 600 may perform a method 700 of wireless communication, by such as via execution of a load balancing component 615 by processor 605 and/or memory 610. The network node may be implemented as a central controller (e.g., controller 310 of FIG. 3).

At block 702, the method 700 includes obtaining load information from each wireless device of a set of wireless devices, the load information being indicative of resource availability for each band available to each wireless device of the set. For example, in an aspect, network node 600, processor 605, memory 610, load balancing component 615, and/or obtaining component 620 may be configured to or may comprise means for obtaining load information from each wireless device of a set of wireless devices, the load information being indicative of resource availability for each band available to each wireless device of the set.

For example, the obtaining at block 702 may include receiving load information from multiple APs within a mesh network. Further, for example, the obtaining at block 702 may be performed so that the network node 600 can determine which AP of the multiple APs communicates over a band with the most congestion.

At block 704, the method 700 includes identifying a first band and a first wireless device of the set of wireless devices associated with the first band based on the first band having a highest level of traffic among bands available to the set of wireless devices. For example, in an aspect, network node 600, processor 605, memory 610, load balancing component 615, and/or identifying component 625 may be configured to or may comprise means for identifying a first band and a first wireless device of the set of wireless devices associated with the first band based on the first band having a highest level of traffic among bands available to the set of wireless devices.

For example, the identifying at block 704 may include determining a tuple (e.g., an AP and a band used by the AP) indicative of the AP and band having a highest level of traffic. Further, for example, the identifying at block 704 may be performed to determine which of the multiple APs in a mesh network has a most congested band, and which of the multiple bands used by the APs is the most congested.

At block 706, the method 700 includes outputting for transmission to the first wireless device: the load information from each wireless device in the set of wireless devices other than the first wireless device, and a request for the first wireless device to perform load balancing based on the load information. For example, in an aspect, network node 600, processor 605, memory 610, load balancing component 615, and/or outputting component 630 may be configured to or may comprise means for outputting for transmission to the first wireless device: the load information from each wireless device in the set of wireless devices other than the first wireless device, and a request for the first wireless device to perform load balancing based on the load information.

For example, the outputting at block 706 may include an indication, to an AP with the highest congestion, to perform load balancing while taking into account the load balancing information of other APs in the mesh network.

Referring to FIG. 8, in an alternative or additional aspect, at block 802, the method 700 may further include outputting, for transmission to each wireless device of the set of wireless devices, a request for the load information from each wireless device. For example, in an aspect, network node 600, processor 605, memory 610, load balancing component 615, and/or outputting component 830 may be configured to or may comprise means for outputting, for transmission to each wireless device of the set of wireless devices, a request for the load information from each wireless device.

For example, the outputting at block 802 may include transmitting, to each AP in a mesh network (or at least N hop APs) a request to provide the central controller with load information. Such a request transmission may trigger the APs to transmit their load information to the controller.

In an alternative or additional aspect, the first band is identified based on the first band having a highest level of traffic relative to other bands available to each wireless device of the set of wireless devices, and wherein the first wireless device is identified based on the traffic of the first band associated with the first wireless device.

Referring to FIG. 9, in an alternative or additional aspect wherein the set of wireless devices is a first set of wireless devices and the load information is a first load information, at block 902, the method 700 may further include obtaining second load information from each wireless device of a second set of wireless devices, the second load information being indicative of resource availability for each band available to each wireless device in the second set of wireless devices. For example, in an aspect, network node 600, processor 605, memory 610, load balancing component 615, and/or obtaining component 640 may be configured to or may comprise means for obtaining second load information from each wireless device of a second set of wireless devices, the load information being indicative of resource availability for each band available to each wireless device in the second set of wireless devices.

For example, the obtaining at block 902 may collect load information from subsets of APs in the mesh network. For instance, the controller may group APs and collect load information from the different groups.

In this optional aspect, at block 904, the method 700 may further include identifying a second band and a second wireless device associated with the second band based on the second band having a highest level of traffic among bands available to the second set of wireless devices. For example, in an aspect, network node 600, processor 605, memory 610, load balancing component 615, and/or identifying component 645 may be configured to or may comprise means for identifying a second band and a second wireless device associated with the second band based on the second band having a highest level of traffic among bands available to the second set of wireless devices.

For example, the identifying at block 904 may identify multiple tuples, wherein each of the multiple tuples are associated with a different group of APs.

In this optional aspect, at block 906, the method 700 may further include outputting for transmission to the second wireless device: the second load information from each wireless device in the second set of wireless devices other than the second wireless device, and a request for the second wireless device to perform load balancing based on the second load information. For example, in an aspect, network node 600, processor 605, memory 610, load balancing component 615, and/or outputting component 630 may be configured to or may comprise means for outputting for transmission to the second wireless device: the second load information from each wireless device in the second set of wireless devices other than the second wireless device, and a request for the second wireless device to perform load balancing based on the second load information.

For example, the outputting at block 1106 may determine a tuple associated with each group of APs, then transmit load information of the APs of each group to the AP associated with the tuple of that group. That way, the AP with the highest congestion in each group can perform load balancing within that group using load balancing information from each AP within the group.

In an alternative or additional aspect, the first set of wireless devices comprises the first wireless device and one or more additional wireless devices separated by less than or equal to N hops, wherein the second set of wireless devices comprises the second wireless device and one or more additional wireless devices separated by less than or equal to N hops, and wherein the first wireless device is separated from the second wireless device by more than N hops.

Figure 10:
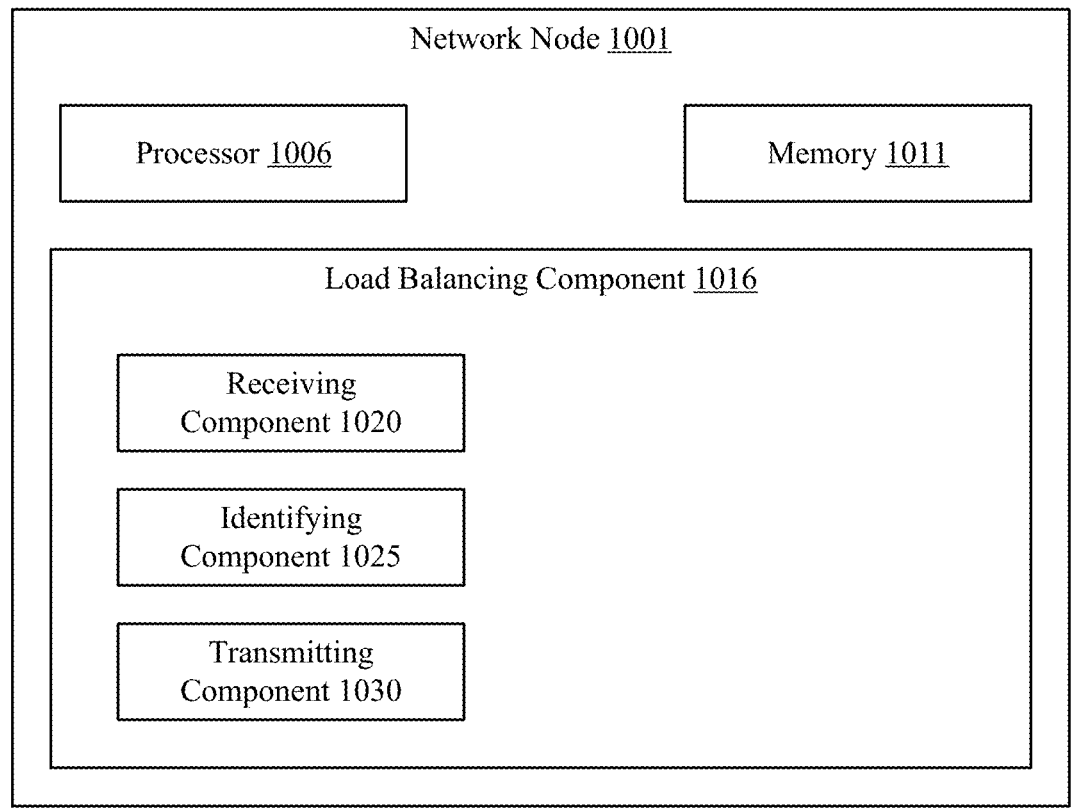
FIG. 10 is a block diagram of an example of an apparatus having components configured to perform a method of wireless communication by a network node.

Referring to FIGS. 10 and 11, in another aspect, network node 1001 may perform a method 1100 of wireless communication, by such as via execution of load balancing component 1016 by processor 1006 and/or memory 1011.

At block 1102, the method 1100 includes receiving load information from each wireless device of a set of wireless devices, the load information being indicative of resource availability for each band available to each wireless device. For example, in an aspect, network node 1001, processor 1006, memory 1011, load balancing component 1016, and/or receiving component 1020 may be configured to or may comprise means for receiving load information from each wireless device of a set of wireless devices, the load information being indicative of resource availability for each band available to each wireless device.

For example, the receiving at block 1302 may include receiving load information from one or more APs in a mesh network. For example, if an AP has a congestion level that drops below a particular threshold, then that AP may transmit its load information to its neighboring APs. In some examples, receiving the load information may trigger the network node (e.g., another AP in the mesh network) to pass the load information on to another AP along with its own load information. In some examples, the load information is received from a centralized controller.

At block 1104, the method 1100 includes identifying a first band and a first wireless device of the set of wireless devices associated with the first band based on the first band having a highest level of traffic among bands available to the set of wireless devices. For example, in an aspect, network node 1001, processor 1006, memory 1011, load balancing component 1016, and/or identifying component 1025 may be configured to or may comprise means for identifying a first band and a first wireless device of the set of wireless devices associated with the first band based on the first band having a highest level of traffic among bands available to the set of wireless devices.

For example, the identifying at block 1104 may include determining a tuple associated with an AP that has the highest congestion in the mesh network based on the received load information.

At block 1106, the method 1100 includes transmitting to the first wireless device: the load information from each wireless device in the set of wireless devices other than the first wireless device, and a request for the first wireless device to perform load balancing based on the load information. For example, in an aspect, network node 1001, processor 1006, memory 1011, load balancing component 1016, and/or transmitting component 1030 may be configured to or may comprise means for transmitting to the first wireless device: the load information from each wireless device in the set of wireless devices other than the first wireless device, and a request for the first wireless device to perform load balancing based on the load information.

Figure 12:
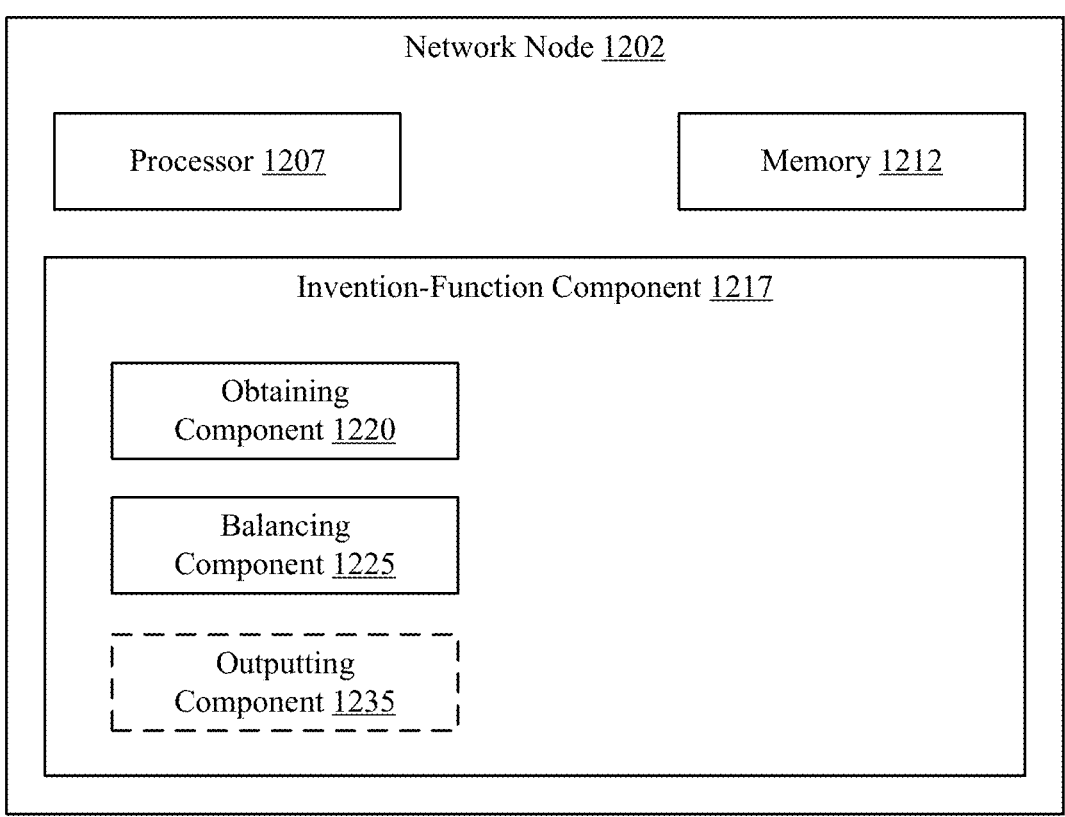
FIG. 12 is a block diagram of an example of an apparatus having components configured to perform a method of wireless communication by a network node.
Figure 13:
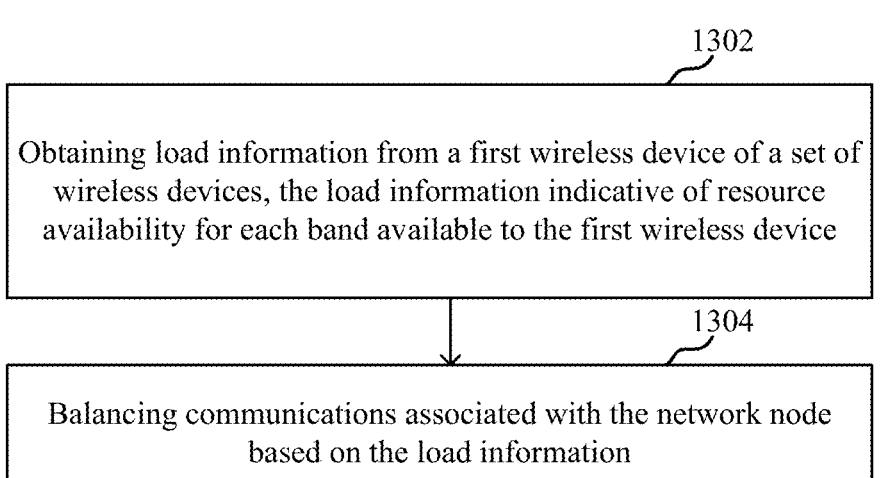
FIG. 13 is a flowchart of an example of a method of wireless communication by a network node.

Referring to FIGS. 12 and 13, in another aspect, network node 1202 may perform a method 1300 of wireless communication, by such as via execution of load balancing component 1217 by processor 1207 and/or memory 1212. In this example, the network node 1202 may be implemented as an AP (e.g., AP 102 of FIG. 1) of a mesh network.

At block 1302, the method 1300 includes obtaining load information from a first wireless device of a set of wireless devices, the load information indicative of resource availability for each band available to the first wireless device. For example, in an aspect, network node 1202, processor 1207, memory 1212, load balancing component 1217, and/or obtaining component 1220 may be configured to or may comprise means for obtaining load information from a first wireless device of a set of wireless devices, the load information indicative of resource availability for each band available to the first wireless device.

At block 1304, the method 1300 includes balancing communications associated with the network node based on the load information. For example, in an aspect, network node 1202, processor 1207, memory 1212, load balancing component 1217, and/or balancing component 1225 may be configured to or may comprise means for balancing communications associated with the network node based on the load information.

Referring to FIG. 14, in an alternative or additional aspect wherein the load information is a first load information, at block 1402, the method 1300 may further include obtaining, from a second wireless device, a request for second load information indicative of resource availability for each band available to the network node. For example, in an aspect, network node 1202, processor 1207, memory 1212, load balancing component 1217, and/or obtaining component 1220 may be configured to or may comprise means for obtaining, from a second wireless device, a request for second load information indicative of resource availability for each band available to the network node.

In this optional aspect, at block 1404, the method 1300 may further include outputting, for transmission to the second wireless device, the second load information. For example, in an aspect, network node 1202, processor 1207, memory 1212, load balancing component 1217, and/or outputting component 1235 may be configured to or may comprise means for outputting, for transmission to the second wireless device, the second load information.

In an alternative or additional aspect, the network node is separated from the first wireless device by less than or equal to N hops.

In this optional aspect, wherein the first load information is obtained from the second wireless device, at block 1406, the method 1300 may further include obtaining, from the second wireless device, a request for the network node to load balance based on the first load information. For example, in an aspect, network node 1202, processor 1207, memory 1212, load balancing component 1217, and/or component 1220 may be configured to or may comprise means for obtaining, from the second wireless device, a request for the network node to load balance based on the first load information.

In this optional aspect, at block 1408, the balancing at block 1304 of communications is further based on the request.

Referring to FIG. 15, in an alternative or additional aspect wherein the load information is a first load information, at block 1502, the method 1300 may further include outputting, for transmission to one or more wireless devices including the first wireless device, second load information being indicative of resource availability for each band available to the network node, wherein outputting the second load information is at least one of event triggered or periodic. For example, in an aspect, network node 1202, processor 1207, memory 1212, load balancing component 1217, and/or outputting component 1235 may be configured to or may comprise means for outputting, for transmission to one or more wireless devices including the first wireless device, second load information being indicative of resource availability for each band available to the network node, wherein outputting the second load information is at least one of event triggered or periodic.

In an alternative or additional aspect, outputting the second load information is triggered by satisfying of a threshold condition of resource availability for at least one band available to the network node, or by obtaining the first load information.

In an alternative or additional aspect, the network node is separated from the one or more wireless devices by less than or equal to N hops.

In an alternative or additional aspect, balancing communications is further based on the second load information being indicative of the network node having reduced resource availability of a band relative to resource availability of a same band to the first wireless device.

Figure 16:
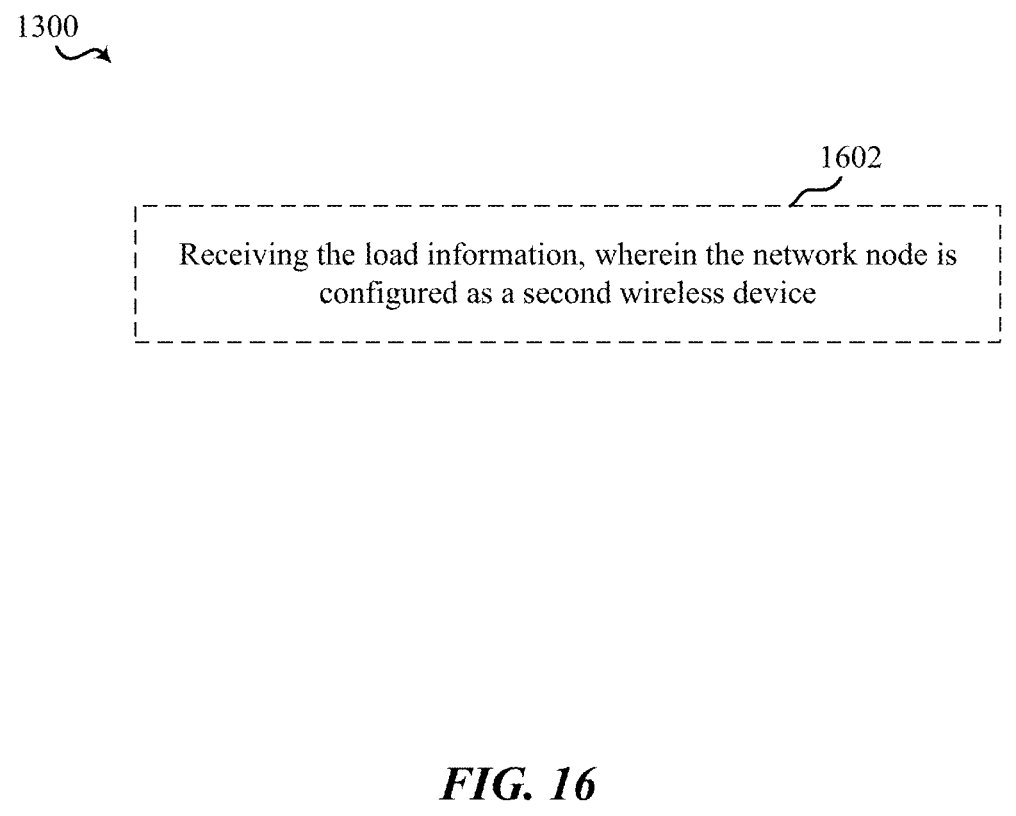

Referring to FIG. 16, in an alternative or additional aspect, at block 1602, the method 1300 may further include receiving the load information, wherein the network node is configured as a second wireless device. For example, in an aspect, network node 1202, processor 1207, memory 1212, load balancing component 1217, and/or receiving component 1240 may be configured to or may comprise means for receiving the load information, wherein the network node is configured as a second wireless device.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Example Aspects

Example 1 is a method of wireless communication by a network node, comprising: obtaining load information from each wireless device of a set of wireless devices, the load information being indicative of resource availability for each band available to each wireless device of the set; identifying a first band and a first wireless device of the set of wireless devices associated with the first band based on the first band having a highest level of traffic among bands available to the set of wireless devices; and outputting for transmission to the first wireless device: the load information from each wireless device in the set of wireless devices other than the first wireless device, and a request for the first wireless device to perform load balancing based on the load information.

Example 2 is the method of example 1, further comprising: outputting, for transmission to each wireless device of the set of wireless devices, a request for the load information from each wireless device.

Example 3 is the method of any of examples 1 and 2, wherein the first band is identified based on the first band having a highest level of traffic relative to other bands available to each wireless device of the set of wireless devices, and wherein the first wireless device is identified based on the traffic of the first band associated with the first wireless device.

Example 4 is the method of any of examples 1-3, wherein the set of wireless devices is a first set of wireless devices, wherein the load information is a first load information, and further comprising: obtaining second load information from each wireless device of a second set of wireless devices, the load information being indicative of resource availability for each band available to each wireless device in the second set of wireless devices; identifying a second band and a second wireless device associated with the second band based on the second band having a highest level of traffic among bands available to the second set of wireless devices; and outputting for transmission to the second wireless device: the second load information from each wireless device in the second set of wireless devices other than the second wireless device, and a request for the second wireless device to perform load balancing based on the second load information.

Example 5 is the method of example 4, wherein the first set of wireless devices comprises the first wireless device and one or more additional wireless devices separated by less than or equal to N hops, wherein the second set of wireless devices comprises the second wireless device and one or more additional wireless devices separated by less than or equal to N hops, and wherein the first wireless device is separated from the second wireless device by more than N hops.

Example 6 is a method of wireless communication by a network node, comprising: obtaining load information from a first wireless device of a set of wireless devices, the load information indicative of resource availability for each band available to the first wireless device; and balancing communications associated with the network node based on the obtained load information.

Example 7 is the method of example 6, wherein the load information is a first load information, and further comprising: obtaining, from a second wireless device, a request for second load information indicative of resource availability for each band available to the network node; and outputting, for transmission to the second wireless device, the second load information.

Example 8 is the method of example 7, wherein the network node is separated from the first wireless device by less than or equal to N hops.

Example 9 is the method of example 7, wherein the first load information is obtained from the second wireless device, and further comprising: obtaining, from the second wireless device, a request for the network node to load balance based on the first load information; and wherein balancing communications is further based on the request.

Example 10 is the method of any of examples 6-9, wherein the load information is a first load information, and further comprising: outputting, for transmission to one or more wireless devices including the first wireless device, second load information being indicative of resource availability for each band available to the network node, wherein outputting the second load information is at least one of event triggered or periodic.

Example 11 is the method of example 10, wherein outputting the second load information is triggered by satisfying of a threshold condition of resource availability for at least one band available to the network node, or by obtaining the first load information.

Example 12 is the method of example 10, wherein the network node is separated from the one or more wireless devices by less than or equal to N hops.

Example 13 is the method of example 10, wherein balancing communications is further based on the second load information being indicative of the network node having reduced resource availability of a band relative to resource availability of a same band to the first wireless device.

Example 14 is the method of any of examples 6-13, further comprising: receiving the load information, wherein the network node is configured as a second wireless device.

Example 15 is a network node, comprising: a transceiver; a memory comprising instructions; and one or more processors configured to execute the instructions to cause the network node to perform a method in accordance with any one of examples 1-5, wherein the transceiver is configured to: receive load information from each wireless device; and transmit to the first wireless device: the load information from each wireless device in the set of wireless devices other than the first wireless device, and a request for the first wireless device to perform load balancing based on the load information.

Example 16 is a network node, comprising: a transceiver; a memory comprising instructions; and one or more processors configured to execute the instructions and cause the network node to perform a method in accordance with any one of examples 6-14, wherein the transceiver is configured to: receive load information from a first wireless device of a set of wireless devices, the load information indicative of resource availability for each band available to the first wireless device.

Example 17 is an apparatus for wireless communications, comprising means for performing a method in accordance with any one of examples 1-5.

Example 18 is an apparatus for wireless communications, comprising means for performing a method in accordance with any one of examples 6-14.

Example 19 is a non-transitory computer-readable medium comprising instructions that, when executed by an apparatus, cause the apparatus to perform a method in accordance with any one of examples 1-5.

Example 20 is a non-transitory computer-readable medium comprising instructions that, when executed by an apparatus, cause the apparatus to perform a method in accordance with any one of examples 6-14.

Example 21 is an apparatus for wireless communications, comprising: a memory comprising instructions; and one or more processors configured to execute the instructions to cause the apparatus to perform a method in accordance with any one of examples 1-5.

Example 22 is apparatus for wireless communications, comprising: a memory comprising instructions; and one or more processors configured to execute the instructions to cause the apparatus to perform a method in accordance with any one of examples 6-14.

Additional Considerations

The preceding description provides examples of techniques for increasing local area network (LAN) device privacy in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the terms "identifying" and/or "determining" (or any variants thereof such as "identify" and determine") encompass a wide variety of actions. For example, "identifying" and/or "determining" may include calculating, computing, processing, deriving, investigating, looking up (e.g., looking up in a table, a database or another data structure), ascertaining and the like. Also, "identifying" and/or "determining" may include receiving (e.g., receiving information), accessing (e.g., accessing data in a memory) and the like. Also, "identifying" and/or "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus configured for wireless communication, comprising:

one or more memories comprising instructions; and one or more processors configured to execute the instructions and cause the apparatus to:

receive first load information from a first wireless device of a set of wireless devices, the first load information being received from a second wireless device and indicative of a first percentage of airtime available for serving traffic over each of a plurality of bands available to the first wireless device;

receive, from the second wireless device, a first request for second load information indicative of a second percentage of airtime available for serving traffic over each band available to the apparatus;

transmit, to the second wireless device, the second load information;

receive, from the second wireless device, a second request for the apparatus to load balance taking into account the first load information; and load balance communications by the apparatus taking into account the received first load information and the second request.

2. The apparatus of claim 1, wherein the apparatus is separated from the first wireless device by less than or equal to N hops.

3. The apparatus of claim 1, wherein the one or more processors are further configured to cause the apparatus to:

transmit, to one or more wireless devices including the first wireless device, the second load information indicative of the second percentage of airtime available for serving traffic over each band available to the apparatus, wherein the transmitting of the second load information to the one or more wireless devices including the first wireless device is at least one of event triggered or periodic.

4. The apparatus of claim 3, wherein the transmitting of the second load information to the one or more wireless devices including the first wireless device is triggered by:

satisfaction of a threshold condition of a percentage of airtime available for serving traffic over at least one band available to the apparatus, or the received first load information.

5. The apparatus of claim 3, wherein the apparatus is separated from the one or more wireless devices by less than or equal to N hops.

6. The apparatus of claim 3, wherein the load balancing further takes into account the second load information being indicative of the apparatus having a reduced percentage of airtime available for serving traffic over a band relative to the first percentage of airtime available for serving traffic over of the same band to the first wireless device.

7. The apparatus of claim 1, further comprising a transceiver configured to:

receive the first load information, wherein the apparatus is configured as a third wireless device.

8. A method of wireless communication by a network node, comprising:

receiving first load information from a first wireless device of a set of wireless devices, the first load information being received from a second wireless device and indicative of a first percentage of airtime available for serving traffic over each of a plurality of bands available to the first wireless device;

receiving, from the second wireless device, a first request for second load information indicative of a second percentage of airtime available for serving traffic over each band available to the network node;

transmitting, to the second wireless device, the second load information;

receiving, from the second wireless device, a second request for the network node to load balance taking into account the first load information; and load balancing communications by the network node taking into account the received first load information and the second request.

9. The method of claim 8, wherein the network node is separated from the first wireless device by less than or equal to N hops.

10. The method of claim 8, further comprising:

transmitting, to one or more wireless devices including the first wireless device, the second load information indicative of the second percentage of airtime available for serving traffic over each band available to the network node, wherein the transmitting the second load information to the one or more wireless devices including the first wireless device is at least one of event triggered or periodic.

11. The method of claim 10, wherein the transmitting the second load information to the one or more wireless devices including the first wireless device is triggered by:

satisfaction of a threshold condition of a percentage of airtime available for serving traffic over at least one band available to the network node, or the receiving the first load information.

12. The method of claim 10, wherein the network node is separated from the one or more wireless devices by less than or equal to N hops.

13. The method of claim 10, wherein the load balancing further takes into account the second load information being indicative of the network node having a reduced percentage of airtime available for serving traffic over a band relative to the first percentage of airtime available for serving traffic over of the same band to the first wireless device.

14. An apparatus configured for wireless communication, comprising:

means for receiving first load information from a first wireless device of a set of wireless devices, the first load information being received from a second wireless device and indicative of a first percentage of airtime available for serving traffic over each of a plurality of bands available to the first wireless device;

means for obtaining, from the second wireless device, a first request for second load information indicative of a second percentage of airtime available for serving traffic over each band available to the apparatus;

means for outputting, for transmission to the second wireless device, the second load information;

the means for obtaining being further configured to obtain, from the second wireless device, a second request for the apparatus to load balance taking into account the first load information; and means for load balancing communications by the apparatus taking into account the received first load information and the second request.

* * * * *